US005998895A

United States Patent [19]

Thrasher et al.

[11] Patent Number: 5,998,895

[45] Date of Patent: Dec. 7, 1999

[54] SEAL FOR STARTER MOTOR DRIVE

[75] Inventors: Robert Thrasher, Brownsville; Eduardo Rodriguez, Harlingen, both of Tex.

[73] Assignee: Johnson Electric Automotive, Inc., Plymouth, Mich.

[21] Appl. No.: 09/248,959

[22] Filed: Feb. 12, 1999

[51] Int. Cl.$^6$ ........ H02K 7/06

[52] U.S. Cl. ........ 310/83; 290/38 R; 290/40; 74/74

[58] Field of Search ........ 310/83, 90; 290/38 A, 290/38 R, 48; 74/7 R

[56] References Cited

U.S. PATENT DOCUMENTS

| | | | |
|---|---|---|---|
| 2,455,328 | 9/1948 | Buxton | 290/38 R |
| 2,818,735 | 1/1958 | Sabatini | 74/7 R |
| 3,666,958 | 5/1972 | Ruhle et al. | 290/48 |
| 3,791,684 | 2/1974 | Hamman | 290/38 R |
| 3,791,685 | 2/1974 | Hamman | 290/38 R |
| 4,308,462 | 12/1981 | McMillen | 290/38 R |
| 4,330,713 | 5/1982 | Greenwood | 290/48 |
| 4,369,666 | 1/1983 | Kern | 74/7 R |
| 4,479,394 | 10/1984 | Greenwood et al. | 74/7 R |
| 5,046,373 | 9/1991 | Zabrowski et al. | 74/7 R |

*Primary Examiner*—Nestor Ramirez
*Assistant Examiner*—Joseph Waks
*Attorney, Agent, or Firm*—Howard & Howard

[57] ABSTRACT

An improved drive arrangement for a starter motor includes a rubber cushion between a drive plate and a pinion gear. The rubber cushion has seals at inner and outer locations which seal against the drive plate. In this way, the area between the drive plate and the rubber cushion is sealed to prevent contaminants from reaching the area and harming the connection between the drive plate and cushion.

7 Claims, 2 Drawing Sheets

SEAL FOR STARTER MOTOR DRIVE

BACKGROUND OF THE INVENTION

This application relates to an improved seal for a connection between a driver plate and its associated rubber cushion in a starter motor drive assembly.

In the prior art, start motors are utilized to initiate turning a vehicle engine. An electric motor drives a pinion, which engages a ring gear. Upon rotation of the ring gear, the engine is turned to begin operation of the engine. At the same time, other components act to start the engine to be self-running.

In one known type of starter motor, the pinion gear is associated with the electric motor and is brought selectively into contact with the starter motor ring gear upon start-up of the electric motor. The electric motor has a drive shaft which rotates a drive plate spaced on an opposed side of the pinion from the side gear. A rubber cushion is positioned to connect the drive plate to the pinion. The drive plate is mounted on threads on the drive shaft. Upon start-up of the electric motor, the pinion is rotated. The pinion, rubber cushion and drive plate all move on the threads on the shaft such that the pinion engages the ring gear. Once the pinion engages the ring gear, the drive plate continues to move on the threads, and compresses the rubber cushion between the drive plate and the pinion. As the rubber cushion becomes compressed, the amount of torque transmitted from the shaft to the pinion increases due to the drive plate approaching the pinion, and the drive plate beginning to transmit a portion of the torque.

The above-described general operation for a starter motor is known in the art, and has achieved wide success. However, there are challenges with this design. The interface between the drive shaft and the drive plate, and in particular, the threaded connections, are greased. If there is too much grease placed at the interface, the grease will sometimes migrate into the area between the drive plate and the rubber cushion. This is undesirable, and can affect the connection between the drive plate and the rubber cushion. Moreover, the contaminants, such as water, oil, dust, etc., can move into the area between the drive plate and the rubber cushion. This is undesirable.

SUMMARY OF THE INVENTION

In a disclosed embodiment of this invention, the drive plate has a first tubular portion extending away from the rubber cushion. A radially enlarged flange extends into a channel in the cushion. A radially smaller inner neck extends from the flange further into the cushion and towards the pinion. The cushion is provided with an inner sealing lip which has a relaxed inner diameter which is greater than the outer diameter of the inner neck of the drive plate. This inner lip is deformed by the drive plate inner neck and thus provides a seal at an inner location.

The rubber cushion also has an outer periphery sealed by a lip which also has a relaxed position deformed by the drive plate flange when inserted into the channel. Thus, a space between the drive cushion and the drive plate is sealed at both radially inner and radially outer locations. These two seals prevent grease, or other contaminations from reaching the space. As such, this invention improves the overall life of the drive arrangement.

These and other features of the present invention can be best understood from the following specification and drawings, the following of which is a brief description.

DETAILED DESCRIPTION OF A PREFERRED EMBODIMENT

Figure 1:
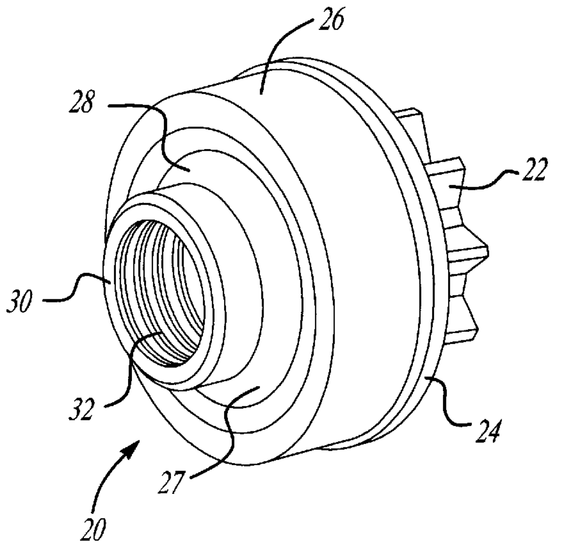
FIG. 1 is a perspective view of a drive arrangement for a starter motor.

FIG. 1 shows a drive arrangement 20 for driving a pinion 22. As shown, the pinion has a disc base 24. A rubber cushion 26 is received between the pinion 22 and a drive plate 28. The drive plate flange is provided with a tubular portion 30 which includes a thread which is formed on a double helix 32.

Figure 2:
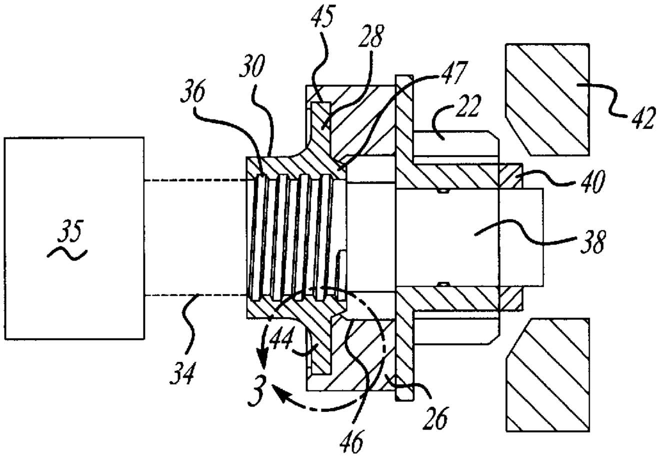
FIG. 2 is a cross-sectional view schematically showing the attachment of this arrangement into a starter motor.

As shown in FIG. 2, a drive shaft 34 (shown in phantom) is mounted to a motor 35. The motor 35 drives the drive shaft. A thread 36 on the outer periphery of the drive shaft 34 moves within the threads 32. An unthreaded portion 38 of the drive shaft extends through the pinion 22. A snap ring 40, or other structure, locks the rubber cushion 26 and drive plate 28 onto the drive shaft 34. A ring gear 42 is positioned adjacent the pinion gear 22. Upon start-up of the motor 35, the forces on the pinion 22, rubber cushion 26 and drive plate 28, cause the three elements to move to the right as shown in FIG. 2. The pinion 22 engages teeth on an inner periphery of the ring gear 42. The ring gear 42 is associated with an internal combustion engine of the vehicle, and will start to turn the internal combustion engine.

As shown, once pinion gear 22 initially engages the ring gear 42, the rotation of pinion gear 22 is initially stopped due to the high torque required to drive the ring gear and its associated internal combustion engine. The drive plate 28 continues to move on threads 32, and it moves to the right as shown in FIG. 2. As the drive plate 28 moves, it compresses the rubber cushion 26. Once the rubber cushion has been compressed a sufficient amount, the drive plate begins to also transmit torque to the pinion gears 22. At that time, there is sufficient torque to turn the ring gear 44.

Figure 3:
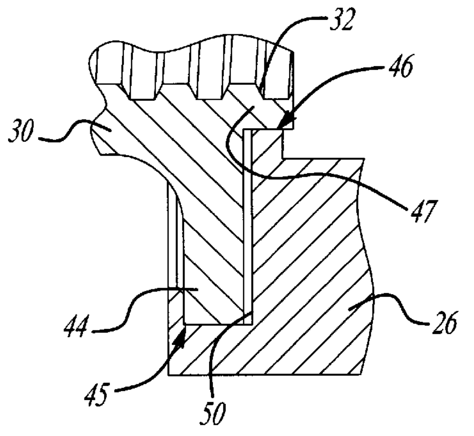
FIG. 3 is an enlarged view of the circular portion 3 of FIG. 2.

FIG. 3 shows the connection of the rubber cushion 26 and drive plate 28. The rubber cushion 26 includes an outer seal lip 44 defined around a channel 45 that receives the flange 27 of the drive plate 28. An inner lip 46 is formed on an inner periphery and abuts an inner neck 47 of the drive plate. The inner neck 47 has an outer diameter which is greater than an inner diameter of the lip 46. Thus, when the inner neck 47 is received within the lip 46, the inner lip 46 is deformed to provide a seal. The outer lip 44 is deformed by the flange 27 when received in the channel 45. The lip 44 thus provides a seal at the outer periphery. An area 50 between the lips 44 and 46 is thus sealed.

Figure 4:
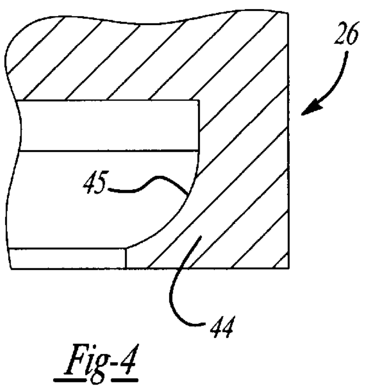
FIG. 4 shows a relaxed cross-section of the rubber cushion outer seal.

FIG. 4 shows a relaxed view of outer lip 44 and channel 45. As can be appreciated, the outer lip 44 has a cross-sectional shape which is somewhat different than the shape shown in FIG. 3 when the lip 44 is in its relaxed position.

Figure 5:
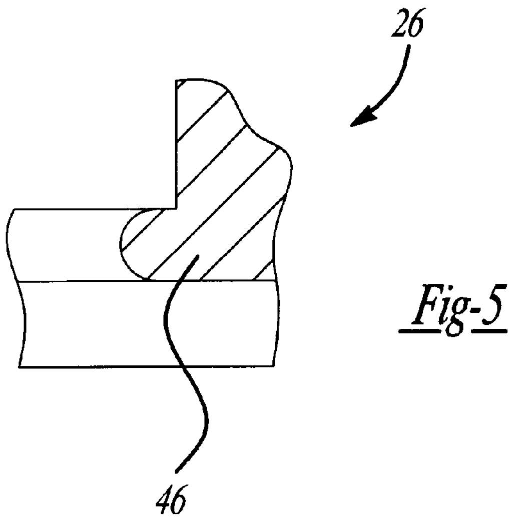
FIG. 5 shows a relaxed cross-section of the rubber cushion inner seal.
Figure 6:
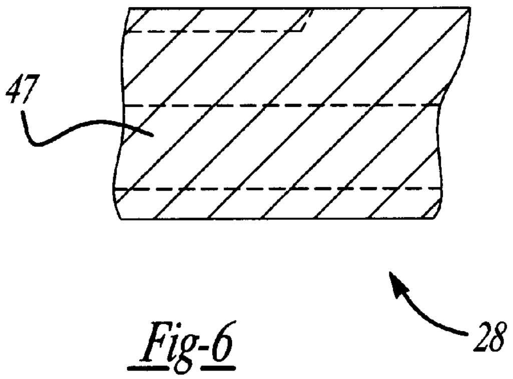
FIG. 6 shows the flange of the drive plate.
Figure 7:
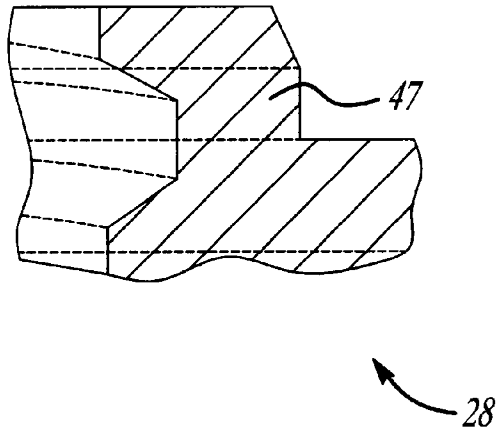
FIG. 7 shows the inner neck of the drive plate.

FIG. 5 shows the inner lip 46 in the relaxed position. FIGS. 6 and 7 show the flange 27 and inner neck 47 of the drive plate 28.

Although a preferred embodiment of this invention has been disclosed, it should be understood that modifications would come within the scope of this invention. For that reason, the following claims should be studied to determine the true scope and content of this invention.

What is claimed is:

1. A drive assembly for a starter motor comprising:

an electric motor having a drive shaft, said drive shaft having a thread over at least a portion of its axial length;

a drive plate having an internal thread received on said portion of said drive shaft;

a pinion gear to be driven by said drive shaft, said pinion gear having gear teeth to selectively engage a portion of an engine starter, said drive plate being positioned closer to said motor than said pinion gear; and a cushion positioned between said drive plate and said pinion gear, said cushion having a channel receiving a flange portion of said drive plate in a channel, said rubber cushion having a radially inner lip sealing on said drive plate at an inner neck spaced toward said pinion gear from said flange portion and a radially outer lip sealing on said drive plate at a position spaced radially outwardly of said inner lip.

2. A drive as recited in claim 1, wherein said inner lip extends radially inwardly to an inner diameter, said inner neck of said drive plate having an outer diameter which is greater than said inner diameter such that said inner neck deforms said inner lip.

3. A drive as recited in claim 2, wherein said outer lip seals against an outer face of said flange on a side of said flange opposed to said inner lip.

4. A drive as recited in claim 3, wherein said outer lip is spaced axially toward said motor relative to said inner lip.

5. A drive as recited in claim 1, wherein said cushion is formed of rubber.

6. A drive as recited in claim 1, wherein said drive plate has threads at an inner peripheral surface, and said shaft has threads at an outer peripheral surface, said drive plate being of the type which moves on said threads to compress said cushion, and increase the torque from said shaft to said pinion gear.

7. A drive assembly for a starter motor comprising:

an electric motor having a drive shaft, said drive shaft having a thread over at least a portion of its axial length;

a drive plate having an internal thread received on said threaded portion of said drive shaft;

a pinion gear to be driven by said drive shaft, said pinion gear having gear teeth to engage a ring gear of a vehicle engine starter said drive plate being positioned closer to said motor than said pinion gear; and a rubber cushion positioned between said drive plate and said pinion gear, said cushion having a channel receiving a flange portion of said drive plate, said cushion having a radially inner lip sealing on said drive plate at an inner neck spaced toward said pinion gear from said flange portion and an outer lip sealing on said flange on a side facing said motor.

* * * * *